(12) United States Patent
Tanba et al.

(10) Patent No.: US 7,428,853 B2
(45) Date of Patent: Sep. 30, 2008

(54) TRANSMISSION APPARATUS HAVING A CLUTCH

(75) Inventors: Toshio Tanba, Kariya (JP); Shiro Ogami, Kariya (JP); Yuichi Fukuhara, Toyoake (JP); Tomohiro Saeki, Anjo (JP); Takahiro Misu, Nagoya (JP); Masaru Shimizu, Toyota (JP)

(73) Assignee: Aisin AI Co., Ltd., Nishio-Shi, Aichi-Ken (JP)

( * ) Notice: Subject to any disclaimer, the term of this patent is extended or adjusted under 35 U.S.C. 154(b) by 213 days.

(21) Appl. No.: 11/192,111

(22) Filed: Jul. 29, 2005

(65) Prior Publication Data
US 2006/0021846 A1 Feb. 2, 2006

(30) Foreign Application Priority Data
Jul. 29, 2004 (JP) ............................. 2004-221616

(51) Int. Cl.
*F16H 3/12* (2006.01)
(52) U.S. Cl. ...................... 74/339; 74/330; 192/219; 192/222
(58) Field of Classification Search ................. 192/216, 192/219, 222
See application file for complete search history.

(56) References Cited

U.S. PATENT DOCUMENTS

| | | | |
|---|---|---|---|
| 3,667,583 A | 6/1972 | Richards | |
| 4,106,364 A | 8/1978 | Zenker et al. | |
| 5,950,781 A * | 9/1999 | Adamis et al. | 192/3.61 |
| 6,186,029 B1 * | 2/2001 | McQuinn | 74/718 |
| 6,700,265 B1 * | 3/2004 | Bouissou | 310/105 |
| 2001/0011050 A1 * | 8/2001 | Yamaguchi et al. | 477/3 |
| 2003/0168302 A1 | 9/2003 | Diemer et al. | |

FOREIGN PATENT DOCUMENTS

| | | |
|---|---|---|
| DE | 1 630 114 A | 4/1971 |
| DE | 23 46 116 A | 3/1975 |
| DE | 102 44 360 A1 | 4/2004 |
| FR | 1 261 402 A | 5/1961 |
| FR | 2 799 251 A1 | 4/2001 |
| GB | 2100384 A * | 12/1982 |
| JP | 2003-120764 A | 4/2003 |
| WO | WO 01/99262 A1 | 12/2001 |

OTHER PUBLICATIONS

European Search Report.

* cited by examiner

*Primary Examiner*—Sherry Estremsky
*Assistant Examiner*—Edwin A Young
(74) *Attorney, Agent, or Firm*—Buchanan Ingersoll & Rooney PC

(57) ABSTRACT

A vehicle transmission apparatus includes an engine generating a driving force; a transmission having, therein, at least one input shaft being connectable to the engine and an output shaft connected to a drive wheel, the transmission being capable of establishing, therein, one of plural shift stages in response to a vehicle driving condition; at least one clutch mechanism for establishing and interrupting transmission of a driving force of the engine to the transmission, the at least one clutch mechanism being capable of being connected to the at least one input shaft; and a braking means for applying a braking force to the engine.

5 Claims, 5 Drawing Sheets

TRANSMISSION APPARATUS HAVING A CLUTCH

CROSS REFERENCE TO RELATED APPLICATIONS

This application is based on and claims priority under 35 U.S.C. §119 with respect to Japanese Patent Application 2004-221616, filed on Jul. 29, 2004, the entire content of which is incorporated herein by reference.

FIELD OF THE INVENTION

This invention generally relates to a transmission apparatus capable of transmitting a vehicle driving force to an output side and establishing, therein, a shift stage appropriate to a vehicle driving condition.

BACKGROUND

A clutch mechanism has been generally used for the purpose of establishing and interrupting a transmission path of a driving force, which is generated by an engine of a vehicle, from the engine to a vehicle drive wheel. A transmission is commonly used together with the clutch mechanism, the transmission in which an input shaft an output shaft and plural gear train are provided. The input shaft is connected to the clutch mechanism. The output shaft is connected to the vehicle drive wheel. The plural gear trains respectively have different speed change ratios that are effective for the purpose of switching a rotational speed ratio between the input shaft and the output shaft. In a transmission apparatus, which incorporates, therein, the clutch mechanism and the transmission, one of the plural gear trains (a first gear train) is selected and gear-meshed, and the clutch mechanism is engaged, wherein the driving force of the engine can be transmitted to the vehicle drive wheel, and the vehicle can drive at a shift stage established by use of the first gear train. Upon a shift operation, the engagement of the clutch mechanism is once released, and another one of the plural gear trains (a second gear train), which is one step higher than the first gear train, is selected and gear-meshed. The clutch mechanism is then once again engaged.

In order to have an occupant seated on a vehicle seat obtain a pleasant feeling, recent requirements have led to improvement in a smoothness of a shift operation. For example, JP2003-120764A discloses a twin-clutch type transmission apparatus having two clutch mechanisms. A twin-clutch transmission apparatus, which is generally used, incorporates, therein, a first clutch capable of connecting a first input shaft of a transmission to an engine, and a second clutch capable of connecting a second input shaft of the transmission to the engine. On the first and second input shafts, plural gear trains are respectively mounted thereon, which respectively possess a different gear ratio. When a shift stage is selected, one of the plural gear trains is gear-meshed with a driven gear mounted on an output shaft, wherein a driving force of the engine is transmitted to a vehicle drive wheel via this twin-clutch type transmission apparatus.

Upon a shift operation while a vehicle is driving, e.g., when a gear engagement condition in a transmission is switched from a first condition, in which one (e.g. a first gear train) of the plural gear trains mounted on the first input shaft has been gear-meshed, and the first clutch has been engaged, to a second condition, in which one (higher than the first gear train) of the plural gear trains mounted on the second input shaft is gear-meshed, this shift operation can be implemented by transmitting an engine driving force by temporal use of both two clutches. More specifically, at a time that the first clutch has been fully engaged and the second clutch has been disengaged, a frictional engagement ratio between the first clutch and the second clutch is controlled. That is, a force for engaging the second clutch is gradually increased, while a force for engaging the first clutch is gradually decreased. As described above, a transmission path of the engine driving force from the engine to the vehicle drive wheel is gradually switched from a transmission path via the first clutch to a transmission path via the second clutch. That is, at the last stage of this shift operation, a driving force of the engine is transmitted to the vehicle drive wheel only by use of the second clutch. Therefore, in this twin-clutch type transmission apparatus, a smooth shift operation can be attained without interrupting transmission of the driving force.

Meanwhile, the aforementioned shift operation is performed while a vehicle is driving at an approximately constant driving speed. A rotational speed of the second input shaft (a higher side) is hence smaller than a rotational speed of the first input shaft (a lower side). Therefore, upon a shift operation, it is necessary to control an engine rotational speed to a lower value. An engine rotational speed can be controlled to a lower value by electronically restraining an amount of fuel to be supplied to the engine. In such circumstances, the second clutch has been rotated in a slip manner so that the second clutch serves as a brake for decreasing an engine rotational speed. When the shift operation is completed, the second clutch is fully engaged, and the second input shaft is rotated in sync with the engine. In this case, it is possible to again increase an engine rotational speed in response to an operation of an accelerating member.

According to the above-described technology, a clutch engagement/disengagement operation and an engine control can be implemented smoothly in such a manner that an occupant to be seated can obtain a comfortable feeling. However, this on occasions causes a long-lasting shift operation. Moreover, when a load applied to an engine is reduced in response to a slip of the first clutch, an engine rotational speed, which is actually expected to drop, is temporality increased. Therefore, fuel racing occur, wherein an amount of fuel injected at an engine and a period of time for a shift operation is increased The present invention has been made in view of the above circumstances, and provides a transmission apparatus having a clutch, the transmission apparatus which is capable of rapidly dropping a rotational speed of an engine at a time of a shift operation and is capable of completing a shift operation in a short period of time, wherein an engine fuel racing can be prevented.

SUMMARY OF THE INVENTION

According to an aspect of the present invention, a vehicle transmission apparatus includes: an engine generating a driving force; a transmission having, therein, at least one input shaft being connectable to the engine and an output shaft connected to a drive wheel, the transmission being capable of establishing, therein, one of plural shift stages in response to a vehicle driving condition; at least one clutch mechanism for establishing and interrupting transmission of a driving force of the engine to the transmission; the at least one clutch mechanism being capable of being connected to the at least one input shaft; and a braking means for applying a braking force to the engine.

It is preferable that the braking means is a frictional clutch or an electromagnetic clutch.

It is preferable that the braking means is a brake generator which includes one of at least one magnet and at least one electronic wire, the one which is capable of rotating in sync with a rotation of the engine, and the other one of the at least one magnet and the at least one electronic wire, the other one which is fixed to a stationary portion and faces the one of the at least one magnet and the at least one electronic wire.

The at least one clutch mechanism can be a clutch mechanism mechanically driven in a frictional manner, which includes, therein a first frictional-type multiple-disc clutch. Further, the at least one clutch mechanism can be a clutch mechanism mechanically driven in a frictional manner, which includes, therein, a first frictional-type multiple-disc clutch and a second frictional-type multiple-disc clutch. Still further, the at least one clutch mechanism can be a clutch mechanism driven in a hydraulic manner. Herein, the clutch mechanism mechanically driven in a frictional manner is a clutch mechanism for a manual transmission or an automated manual transmission, while the clutch mechanism driven in a hydraulic manner is a torque converter for an automatic transmission. Therefore, irrespective of the number of clutch mechanisms and an operation controlling method, the braking means can be applied for any type of vehicles.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
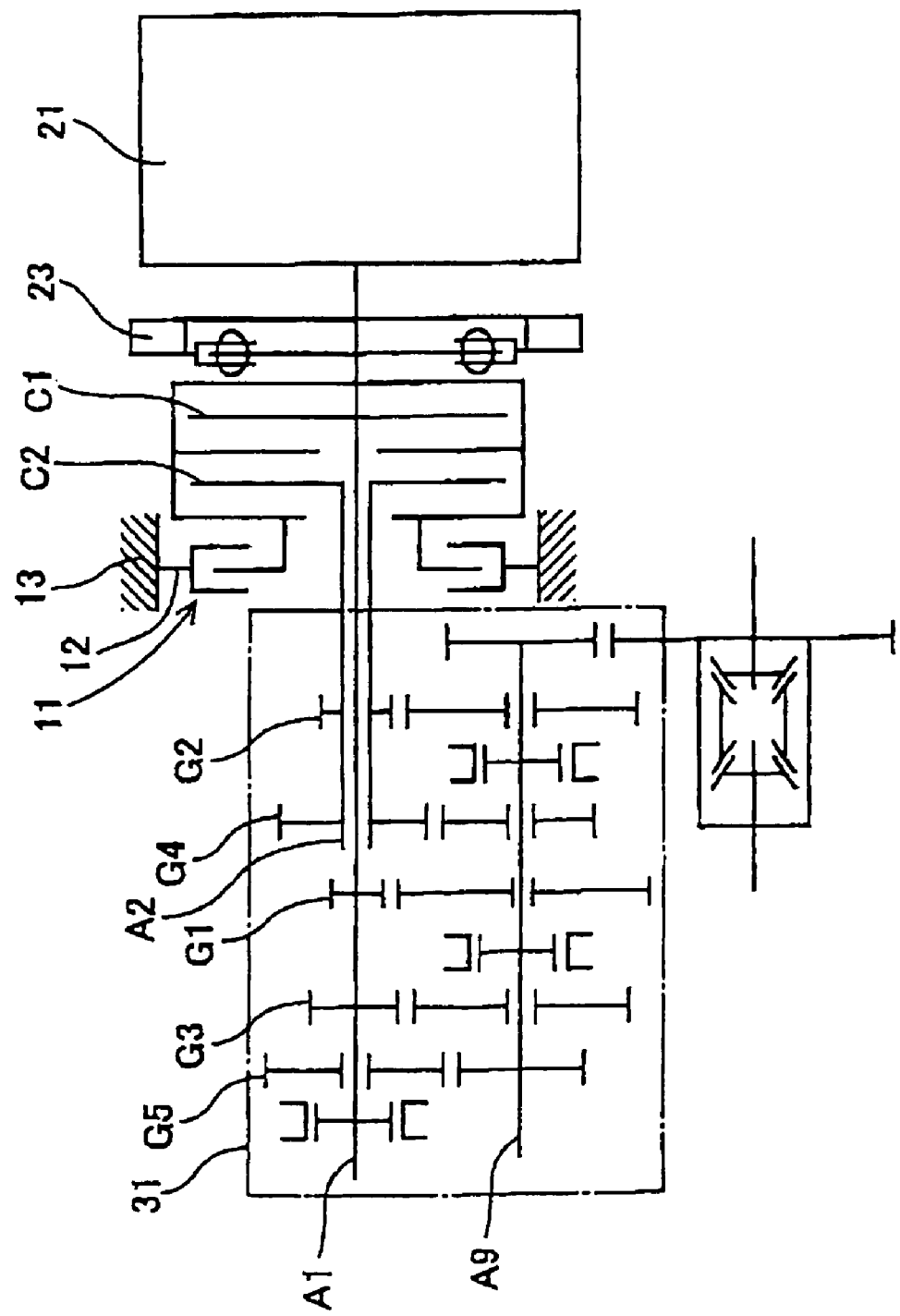
FIG. 1 is a schematic view illustrating a transmission apparatus having clutch mechanisms according to an embodiment of the present invention.

An embodiment of the present invention is described herein with reference to FIG. 1. A transmission apparatus having a clutch mechanism according to the embodiment of the present invention is configured with a twin-clutch type transmission apparatus which incorporates, therein, a braking clutch 11.

In the first place, a structure of the twin-clutch type transmission apparatus is described herein. An output side of an engine 21 is connected to a first clutch C1 and a second clutch C2 via a flywheel damper 23. Both the first clutch C1 and the second clutch C2 respectively serve as a first clutch mechanism (i.e., a clutch mechanism) and a second clutch mechanism (i.e., the clutch mechanism), each of which is configured to establish and interrupt a transmission path of a driving force generated by the engine 21. An output side of the first clutch C1 is connected to a first input shaft A1 of a transmission 31, while an output side of the second clutch C2 is connected to a second input shaft A2 thereof.

On the first input shaft A1, a first shift stage drive gear train G1, a third shift stage drive gear train G3 and a fifth shift stage drive gear train G5 are mounted. The second input shaft A2 is a hollow shaft in which the first input shaft A1 penetrates. On the second input shaft A2, a second shift stage drive gear train G2 and a fourth shift stage drive gear train G4 are mounted. While a vehicle is driving at a normal condition, one of the drive gear trains G1, G2, G3, G4 and G5 is selected and is gear-meshed with a driven gear mounted on an output shaft A9, wherein an engine driving force can be transmitted to a vehicle drive wheel.

Next, described below is a structure of the braking clutch 11 according to the embodiment of the present invention. The braking clutch 11 (corresponding to a braking means) is mainly configured with at least one first frictional clutch disc 11a which is fixedly supported by a stationary portion 12 that is secured to a clutch case 13, and at least one second frictional clutch disc 11b which is splined to a clutch cover V3. An output side of the first clutch disc 11a is not connected to an output side of the engine 21, while an output side of the second clutch disc 11b is connected to the output side of the engine 21. A frictional engagement between the first clutch disc 11a and the second clutch disc 11b can be generated in a slip manner when the second clutch disc 11b is rotated in response to a rotation of the engine 21, which will be described in detail later.

In general, in a conventional vehicle, a transmission path of a driving force generated by an engine from the engine to a transmission is established and interrupted by a clutch mechanism, a shift stage is switched in the transmission in response to a vehicle driving condition. The driving force is transmitted to a drive wheel through the transmission so that a vehicle can drive. As described above, according to the embodiment of the present invention, the braking means is provided so as to connect, in a slip manner, a member, which rotates in sync with the engine, to the other member which is fixedly provided. When the two members are connected in a slip manner, a rotational speed of the one is different from a rotational speed of the other one. Therefore, a frictional force or an electromagnetic force is applied to the engine as a braking force. As the member, which rotates in sync with the engine, a crankshaft of the engine or an input side of the clutch mechanism C1 or C2 is employed as a non-limiting example. As the other member which is fixedly provided, a case, in which the clutch mechanism C1 or C2 is housed, is employed as a non-limiting example. The braking means is positioned between the member, which rotates in sync with the engine, and the other member which is fixedly provided. As the braking means, as described above, a commonly used frictional clutch can be employed, which generally establishes and interrupts a transmission path of a driving force of the engine. Alternatively, as the braking means as described later, a commonly used electromagnetic clutch can be employed, which generally establishes and interrupts a transmission path of a driving force of the engine. If the braking means is connected too rapidly, a driving force transmitted to a drive wheel varies so rapidly. In such circumstances, it would become difficult to shift a driving force from the first clutch C1 to the second clutch C2, thereby damaging a comfortable driving performance. In the light of the foregoing, it is preferable to control a degree of connecting the braking means in such a manner that the shift of the driving force can be implemented continuously and smoothly.

That is, as far as the bracing means can arbitrarily control a degree of connection in a slip manner, any types and methods of braking can be applicable. For example, when a degree of connection in a slip manner is increased, a great amount of frictional force or electromagnetic force is generated, thereby increasing a degree of braking force. On the other hand, when a degree of connection in a slip manner is decreased, a less amount of frictional force of electromagnetic force is generated thereby decreasing a degree of braking force.

Figure 2:
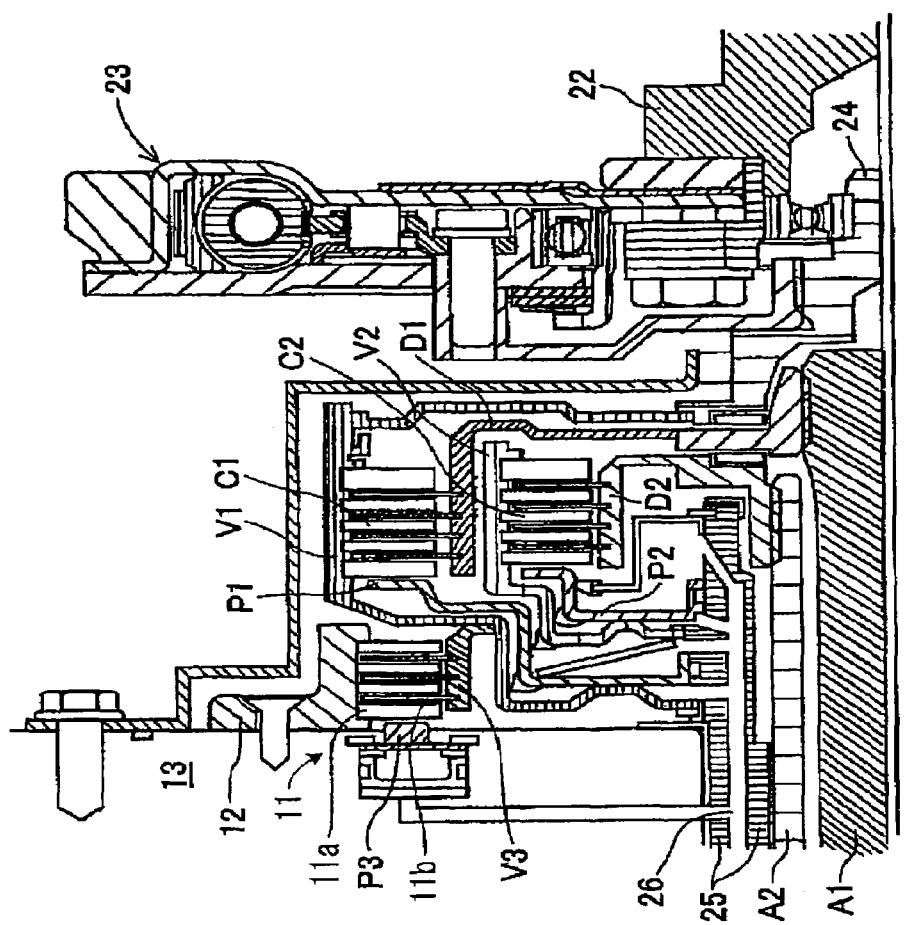
FIG. 2 is a sectional view illustrating a detailed structure of the clutch mechanisms according to the embodiment of the present invention.

Next, described below are detailed structures of the first and second clutch mechanisms C1 and C2 and a structure in the vicinity thereof, with reference to FIG. 2. As is illustrated in FIG. 2, a dashed line is a centre line which represents that the portion including the clutch mechanisms is axially symmetric, and a sectional view illustrated in FIG. 2 shows an only above portion of the axially symmetric clutch mechanisms. A crankshaft 22, which is the output side of the engine 21, is connected to the flywheel damper 23 via bolts. The flywheel damper 23 is splined to a clutch input shaft 24. A first clutch cover V1, an intermediate shaft 25 and a second clutch cover V2 are fixedly connected to the clutch input shaft 24, and are rotatable together with the engine 21, thereby enabling to rotate together with the crankshaft 22 of the engine 21.

The first clutch C1, which is a first frictional-type multiple-disc clutch, is mounted at the first clutch cover V1. An output side of the first clutch C1 is splined to a first clutch drum D1 and is connected to the first input shaft A1 of the transmission 31 via the first clutch drum D1. Likewise, the second clutch C2, which is a second frictional-type multiple-disc clutch, is mounted at the second clutch cover V2. An output side of the second clutch C2 is splined to a second clutch drum D2 and is connected to the second input shaft A2 of the transmission 31 via the second clutch drum D2. The first and second input shafts A1 and A2 transmit a driving force of the engine 21 to the transmission 31.

A first piston P1, which is mounted at the side of the first clutch C1, is capable of operating the first clutch C1 by use of a pressure of oil applied to the first piston P1 itself via an oil passage 26 of the intermediate shaft 25. That is, in response to a pressure degree of oil, the first piston P1 pushes the first clutch C1. The first clutch C1 is then frictionally engaged, wherein a driving force of the engine can be transmitted to the first clutch drum D1. A second piston P2, which is mounted at the side of the second clutch C2, is capable of operating the second clutch C2 by use of a pressure of oil applied thereto. That is, in response to a pressure degree of oil, the second piston P2 pushes the second clutch C2. The second clutch C2 is then frictionally engaged.

Next, described below is a structure of the braking clutch 11. The clutch cover V3 is fixedly connected to the first clutch cover V1, and is rotatable together with the engine 21. The at least one clutch disc 11b of the braking clutch 11 is mounted at the auxiliary clutch cover V3. The at least one clutch disc 11a of the braking clutch 11 is connected, by means of the stationary portion 12 which is fixed, by use of flat head screws, at the clutch case 13. A piston P3, which is mounted at the side of the clutch disc 11a, is capable of operating the braking clutch 11 by use of a pressure of oil applied thereto. That is, in response to a pressure degree of oil, the piston P3 pushes the clutch disc 11a, and a frictional engagement in a slip manner is generated between the clutch disc 11a and the clutch disc 11b in the braking clutch 11. The clutch disc 11a of the braking clutch 11 is secured to the stationary portion 12, wherein it is possible to consume a driving force generated by the engine 21 as heat energy that may occur due to friction.

The transmission apparatus according to the embodiment of the present invention is operated and controlled as described below. In connection with a shift operation from a third shift stage to a fourth shift stage, when a vehicle drives at the third shift stage, the third shift stage drive gear train G3 mounted on the first input shaft. A is gear-meshed with the driven gear on the output shaft A9. In this case, the first clutch C1 has been frictionally engaged so as to transmit a driving force of the engine 21, while the second clutch C2 has been disengaged. When a shift command to the fourth shift stage is inputted to a controller (not shown), the fourth shift stage drive gear train G4 on the second input shaft A2 is required to be frictionally engaged. However, because the second clutch C2 has been disengaged, the second input shaft A2 has been driven from a side of the output shaft A9, and has been rotated idly in sync with the output shaft A9. In such circumstances, because a speed change ratio at the third shift stage is designed to be different from a speed change ratio at the fourth shift stage, a rotational speed of the second input shaft A2 is inferior to a rotational speed of the first input shaft A1.

In a conventional twin-clutch type transmission apparatus, a driving force of the engine 21 is transmitted to the transmission 31 by gradually increasing an engagement force of the second clutch C2 while an engagement force of the first clutch C1 is being reduced. Therefore, a rotational speed of the engine 21 is reduced to a rotational speed of the second input shaft A2 by electronically regulating an amount of fuel supplied to the engine 21. When the rotation of the engine 21 is synchronized with the rotation of the second input shaft A2, the first clutch C1 is completely disengaged, wherein a driving force of the engine 21 is transmitted to the transmission 31 only by use of the second clutch C2. At this point, this shift operation is completed.

According to the embodiment of the present invention, in response to a shift of a transmission path of an engine driving force between the first clutch C1 and the second clutch C2, pressurized oil is supplied to the piston P3. Accordingly, a frictional engagement between the clutch disc 11a and the clutch disc 11b in the braking clutch 11 is generated in a slip manner. Friction hence may occur at the braking clutch 11, and a driving force generated by the engine 21 is consumed as heat energy. Therefore, the braking clutch 11 applies a braking force to the engine 21. In such circumstances, the engine 12 is applied with a braking force by the braking clutch 11, and a rotational speed of the engine 21 is reduced at a high speed which is faster than a conventional speed, wherein a period of time for a shift operation can be abbreviated.

Figure 3A:
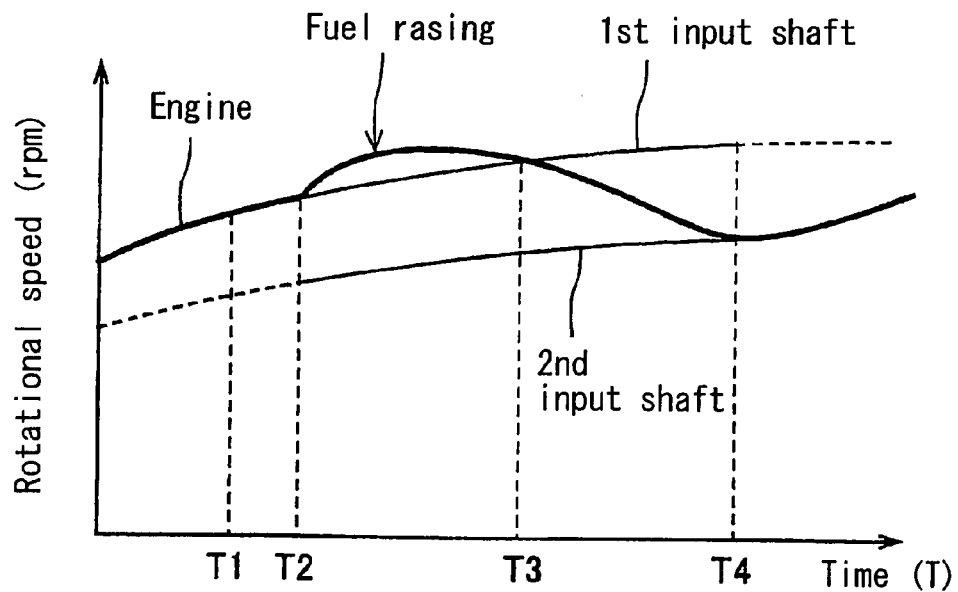
FIG. 3A is a diagram for explaining a shift operation by a conventional twin-clutch type transmission apparatus.
Figure 3B:
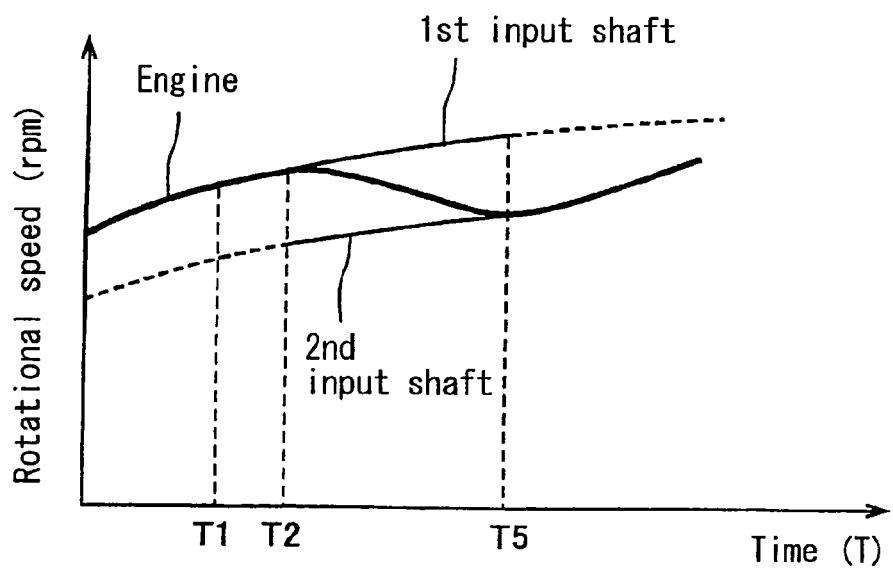
FIG. 3B is a diagram for explaining a shift operation by the transmission apparatus according to the embodiment of the present invention.

FIG. 3A is a time chart for a shift operation from a third shift stage to a fourth shift stage in a conventional twin-clutch type transmission apparatus. FIG. 3B is a time chart for a shift operation from a third shift stage to a fourth shift stage in a twin-clutch type transmission apparatus according to the embodiment of the present invention. In each figure, a horizontal axis represents a passage of time, and a vertical axis represents a rotational speed of each component. In each figure, a heavy line represents a rotational speed of the engine 21, thin lines represent rotational speeds of the first and second input shafts, and a broken line represents engagement/disengagement of the braking clutch 11.

As is illustrated in FIG. 3A, at a conventional twin-clutch type transmission apparatus, when the apparatus receives an acceleration command (from a third shift stage to a fourth shift stage) at a time T1 while a vehicle is driving at a third shift stage, the fourth shift stage drive gear train G4 is fully gear-meshed at a time T2, wherein the fourth shift stage drive gear train G4 commences transmitting a driving force of the engine 21. At a time T4, this shift operation from the third shift stage to the fourth shift stage is completed and an acceleration degree is increased. At a time T2, in response to releasing the first clutch C1 from the frictionally engaged condition, a load of the engine 21 is reduced, and a rotational speed of the engine 21 is increased. In this case, a fuel racing occurs at a time T2 and is continued until a time T3. Afterwards, the rotational speed of the engine 21 is gradually decreased by controlling an amount of fuel to be supplied to the engine 21. At T4, the engine rotational speed is finally synchronized with a rotational speed of the second input shaft A2, wherein the first clutch C1 is released from the frictionally engaged condition, and the shift operation is completed.

On the other hand, as is illustrated in FIG. 3B, at the transmission apparatus according to the embodiment of the present invention, when the apparatus receives an acceleration command (from a third shift stage to a fourth shift stage) at a time T1 while a vehicle is driving at a third shift stage, the fourth shift stage drive gear train G4 is fully gear-meshed at a time T2, wherein the fourth shift stage drive gear train G4 commences transmitting a driving force of the engine 21. At the same time as transmitting the engine driving force by the fourth shift stage drive gear grain G4, the braking clutch 11 is operated as a brake which supplies a braking force to the engine 21. Therefore, as is illustrated in FIG. 3B, a fuel racing is not generated, and a rotational speed of the engine 21 is rapidly decreased. Therefore, a shift operation is completed at a time T5 which is earlier than a time T4 in FIG. 3A.

Figure 5:
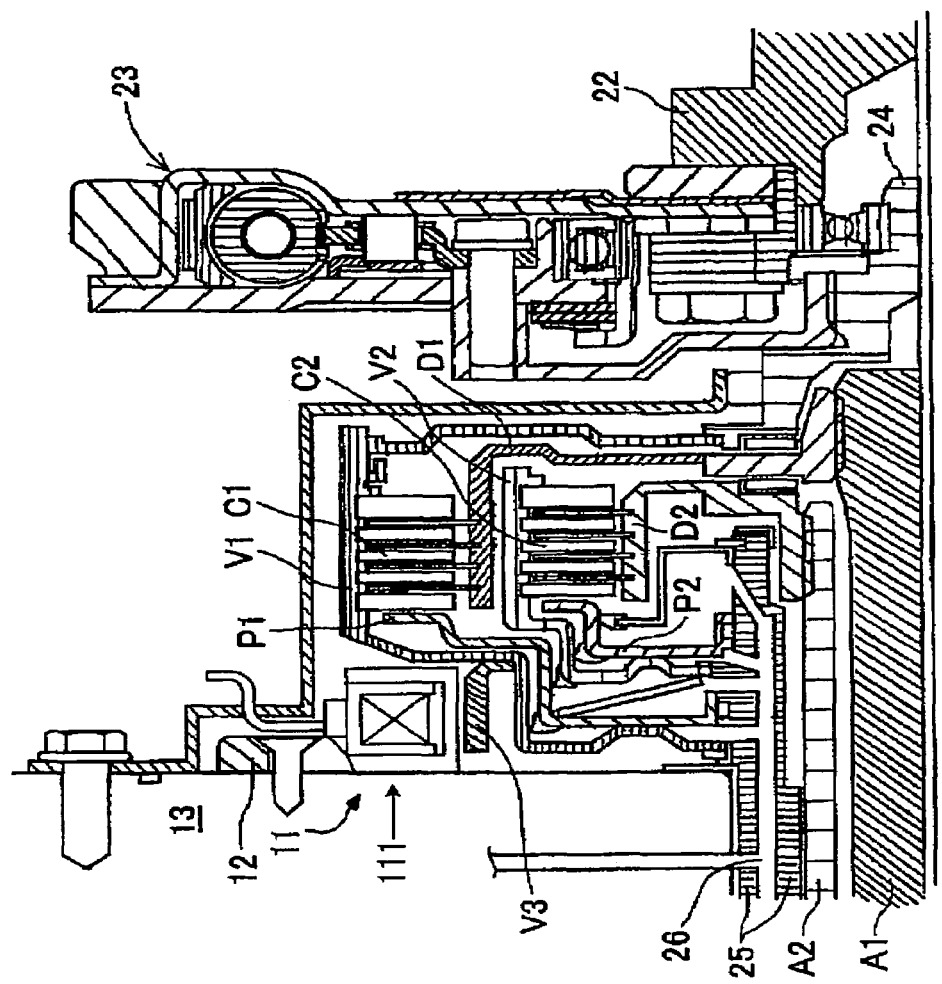
FIG. 5 is a sectional view illustrating a structure having an electromagnetic clutch.

According to the above-described embodiment of the present invention, the braking clutch 11, which is configured with the frictional clutch disc 11a and the frictional clutch disc 11b, is employed as the braking means. Alternatively, the braking clutch 11 can be configured with at least one electromagnetic clutch 111 (illustrated in FIG. 5). In such a case, a driving force of the engine 21 is consumed as electromagnetic energy in substitution for heat energy.

Figure 4:
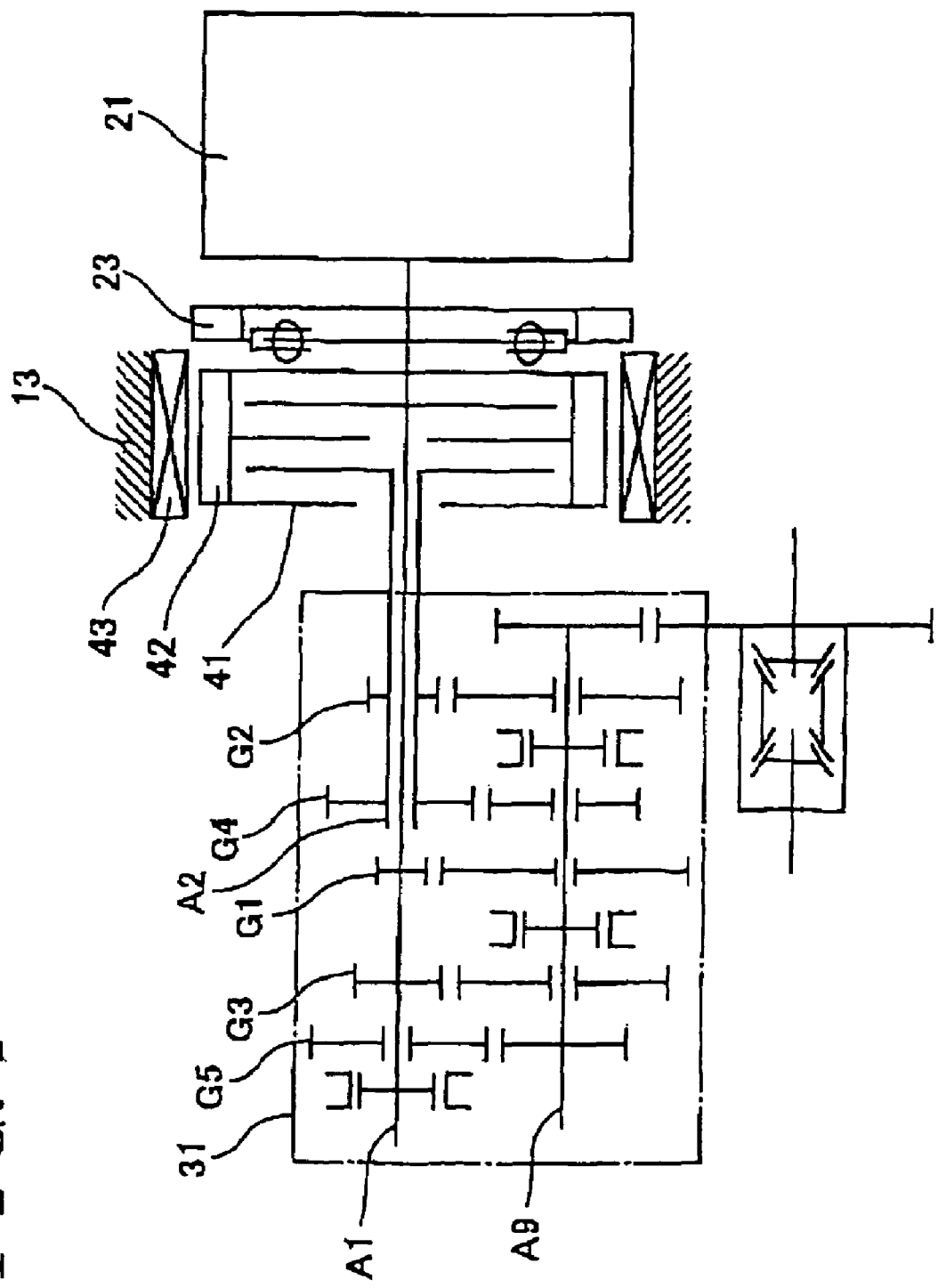
FIG. 4 is a schematic view illustrating a transmission apparatus having a brake generator according to another embodiment of the present invention.

According to another embodiment of the present invention, as is illustrated in FIG. 4, a magnet 42 is attached at an outer periphery of a clutch cover 41 which is connected to the engine 21 and rotates in sync with the engine 21, thereby enabling to generate a rotating magnetic field. An electronic wire 43 is fixedly equipped at the clutch case 13 (i.e., a stationary portion) in such a manner that the electronic wire 43 crosses the rotating magnetic field. This magnet 42 and this electronic wire 43 configure a brake generator (corresponding to the braking means). According to this type of brake generator, as far as an electric load is applied to the electronic wire 43 only upon a shift operation, a mechanical driving force generated by the engine 21 can be converted to an electric energy by this brake generator. In this case, it is possible to consume the driving force of the engine 21 by use of an electric load. Therefore, this brake-generator can function substantially in the same manner as the braking clutch 11 according to the above-described embodiment of the present invention. That is, by converting a driving force generated by the engine 21 to an electric energy and consuming, it is preferable that the brake generator can be employed as a brake which reduces a rotational speed of the engine 21. Therefore, it is possible to apply a brake generator, in which one of the magnet 42 and the electronic wire 43, which rotates in sync with the engine 21, can act as a rotator, and the other one can act as a stator.

This transmission apparatus according to the embodiments of the present invention can be applied to a wide range of vehicle types, regardless of vehicle specifications and transmitting methods of the transmission apparatus. The above description is based on the twin-clutch type transmission apparatus. Alternatively, the braking means can be applied to a single clutch transmission apparatus having a main clutch. For example, upon a shift operation from a first shift stage to a second shift stage, a gear engagement is shifted from an engagement with the first shift stage gear train to an engagement with the second shift stage gear train when the main clutch is disengaged. The braking means is connected in a slip manner in response to this gear shift operation. Therefore, a braking force can be applied to the engine, an engine rotational speed can be reduced rapidly down to a speed level corresponding to the second shift stage. Therefore, a shift operation from the first shift stage to the second shift stage can be completed at an earlier stage by a re-engagement of the main clutch. As described above, the braking means is employed only when a shift-up operation, and is not employed in other cases.

As described above, the braking means according to the embodiments of the present invention enables to rapidly reduce an engine rotational speed from a speed level corresponding to a high rotational speed of the first input shaft A1 down to a speed level corresponding to a low rotational speed of the second input shaft A2. Therefore, compared with a method of electronically controlling a fuel supply to an engine, it is possible to abbreviate a period of time for a shift-up operation Further, according to the embodiments of the present invention, the braking means can generate a braking force which serves as a load subjected to the engine. Therefore, it is effective to restrain an occurrence of increase in an engine rotational speed which on occasions have occurred in a vehicle having a conventional transmission apparatus.

The principles, the preferred embodiments and mode of operation of the present invention have been described in the foregoing specification. However, the invention, which is intended to be protected, is not to be construed as limited to the particular embodiment disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. A vehicle transmission apparatus comprising:
an engine generating a driving force;
a transmission having, therein, at least one input shaft being connectable to the engine and an output shaft connected to a drive wheel, the transmission being capable of establishing, therein, one of plural shift stages in response to a vehicle driving condition;
at least one clutch mechanism for establishing and interrupting transmission of a driving force of the engine to the transmission; the at least one clutch mechanism being capable of being connected to the at least one input shaft; and
a braking clutch arranged between the clutch mechanism and the transmission and including, therein, at least one first frictional clutch disc and at least one second frictional clutch disc, the at least one first frictional clutch disc is supported by a stationary portion and the at least one second frictional clutch disc is connected to the engine so as to rotate together with the engine, wherein a frictional engagement force is generated, at the braking clutch, as a braking force to be applied to the engine.

2. A vehicle transmission according to claim 1, wherein the at least one clutch mechanism is mechanically driven in a frictional manner.

3. A vehicle transmission according to claim 2, wherein the at least one clutch mechanism is a frictional type clutch mechanism which includes, therein, a first frictional-type multiple disc clutch capable of being connected to the at least one input shaft.

4. A vehicle transmission according to claim 3, wherein the frictional type clutch mechanism further includes a second frictional-type multiple-disc clutch, the at least one input shaft includes a first input shaft and a second input shaft, the first frictional-type multiple-disc clutch is capable of being connected to the first input shaft, and the second frictional-type multiple-disc clutch is capable of being connected to the second input shaft.

5. A vehicle transmission according to claim 1, wherein the at least one clutch mechanism is driven in a hydraulic manner.

* * * * *